United States Patent [19]

Nakano et al.

[11] 3,939,580

[45] Feb. 24, 1976

[54] DRIVER TRAINING AID

[76] Inventors: George S. Nakano, 6926 Ashland Drive, Boise, Idaho 83705; Robert J. O'Mera, 965 Orlin Drive, Idaho Falls, Idaho 83401

[22] Filed: Jan. 27, 1975

[21] Appl. No.: 544,537

[52] U.S. Cl. ................. 35/11; 180/79.2 R; 280/89; 272/83 R
[51] Int. Cl.² .......................................... G09B 9/02
[58] Field of Search .......... 272/83, 82, 67; 35/11 R, 35/12 S; 74/388 PS, 496; 280/89; 180/79.2

[56] References Cited
UNITED STATES PATENTS

| | | | |
|---|---|---|---|
| 3,374,850 | 3/1968 | Cech | 180/79.2 R |
| 3,479,750 | 11/1969 | Swanson | 35/11 R |
| 3,594,920 | 7/1971 | Kordewick | 35/11 R |

*Primary Examiner*—Richard C. Pinkham
*Assistant Examiner*—William R. Browne
*Attorney, Agent, or Firm*—John W. Kraft; Charles L. Kraft, II

[57] ABSTRACT

The driver training aid comprises a base, a steering wheel and steering gear of the type found in actual motor vehicles and a variable resistance spring assembly providing simulated resistance of the type encountered over the travel of an actual steering assembly. The variable resistance spring assembly comprises the spring arm fastened at one of its terminal ends to the worm gear shaft of the steering gear, an arcuately spring carringing rod fastened at its terminal ends to the gear housing with the geometrical center thereof being congruent with the center line of the worm gear shaft, and a spring slidably carried on and having its terminal ends secured to the spring carrying rod. As the steering gear reaches the extreme of its travel, the spring assembly is operable to apply increasing pressure to simulate pressures and resistance found in operational steering gears.

3 Claims, 3 Drawing Figures

DRIVER TRAINING AID

FIELD OF INVENTION

The present invention relates to motor vehicle training aids and simulators, and more particularly to improvements to the steering wheel assembly of a motor vehicle training simulator.

DESCRIPTION OF THE PRIOR ART

A variety of devices for simulating the steering wheel have been offered which purport to have the same frictional resistance as in actual motor vehicles. These have conventionally comprised complex assemblies of brake shoes fastened about a shaft to which a conventional steering wheel is fastened. One such device is found in U.S. Pat. No. 3,647,210 and comprises a steering wheel connected by a friction spindle to a brake which is manually adjustable to vary friction resistance to rotation of the steering wheel encountered by a user of the device. The rotation of the spindle is transmitted to the brake through a torque transmission spring. The intended purpose of the brake is to provide an oscillating or kick-back effect when the wheel is rotated. Unfortunately, the spring does not usually behave in the manner of a steering wheel wherein resistance is maintained so long as a rotational force is applied to the wheel, but springs a goodly proportion of the distance back to the original position. Thus, the device has the effect of an oscillating top rather than a steering device which encounters increased resistance at a given number of rotations corresponding to the extremes of travel of a steering assembly.

Accordingly, it is an object of the present invention to provide a driver training aid having a variable resistance spring assembly which employs the basic steering mechanism provided in actual motor vehicles, and that said variable resistance means approximates the varied resistance encountered by an actual steering assembly as it approaches extremes of its travel.

It is another important object of this invention that the variable resistance spring assembly employed herein be of extremely simple construction which is complementary to a steering gear of the type conventionally provided in actual motor vehicles.

It is still another object of this invention that the aforesaid spring assembly be of compact construction which may be employed in a demountable base as well as in a console.

These and other objects shall become apparent from the description following, it being understood that modifications may be made without affecting the teachings of the invention here set out.

SUMMARY OF THE INVENTION

The driver training aid comprises a base, a steering wheel and steering gear of the type found in actual motor vehicles and a variable resistance spring assembly providing simulated resistance of the type encountered over the travel of an actual steering assembly.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
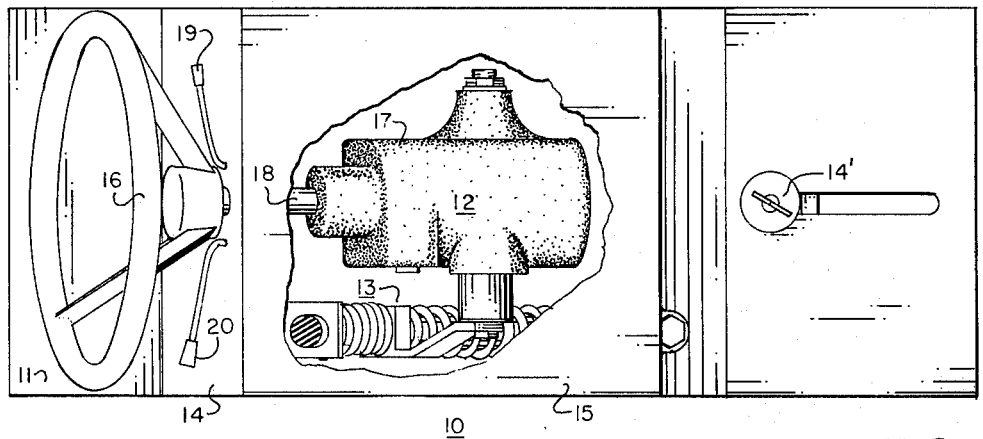
FIG. 1 is a top plan view of the driver training aid of this invention.
Figure 2:
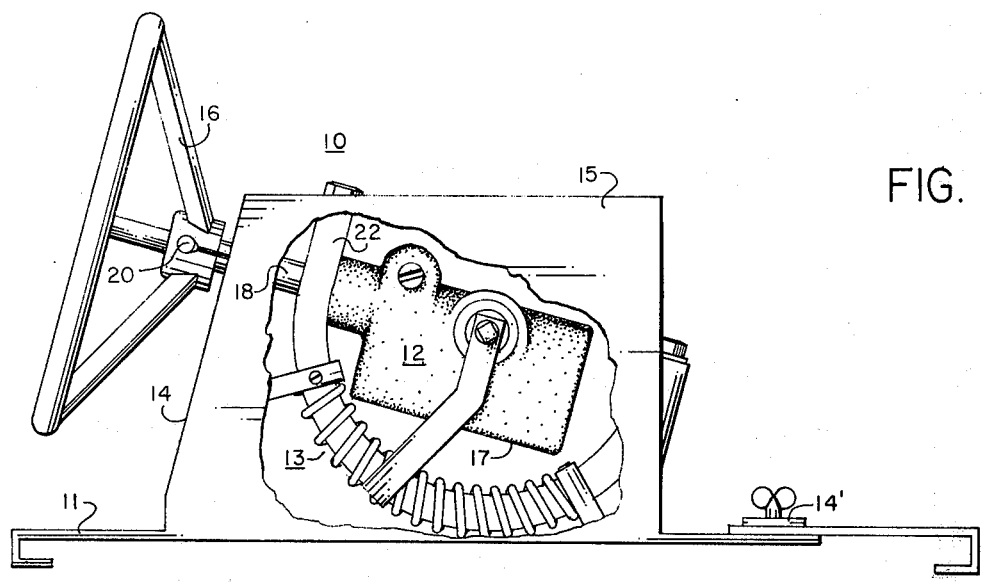
FIG. 2 is a side elevational view of the apparatus of the FIG. 1.

Referring now to the drawings and more particularly to the FIGS. 1 and 2, the driver training aid of this invention is shown to advantage and generally identified by the numeral 10. The training aid 10 comprises a base 11, a steering assembly 12 and a variable tension spring assembly 13. The base assembly 11 comprises a pedestal 14 and the steering assembly housing 15 which issues upwardly from the pedestal 14 in the manner of a vehicle dashboard. Pedestal 14 may be demountably secured to a second pedestal or table (not shown) by means of a compression clamp 14'.

The steering assembly 12 employs a conventional steering wheel 16 and a steering gear 17 as might be found on a motor vehicle. The wheel 16 is secured to the sector shaft 18 of the gear box 17, thus providing the same type of mechanical cooperation as is found in an actual vehicle. The steering gear 17, thus provided with the wheel 16, is mounted into the housing 15 of the base 11 with the face of the steering wheel 16 disposed at approximately 30° to the vertical. An electric turn signal handle 19 may be mounted to the steering assembly 12 with activational electric relays (not shown), and a column-type gear shift handle 20 may be mounted to the steering assembly 12 adjacent to the wheel 16 in the manner associated with actual steering column control clusters.

Figure 3:
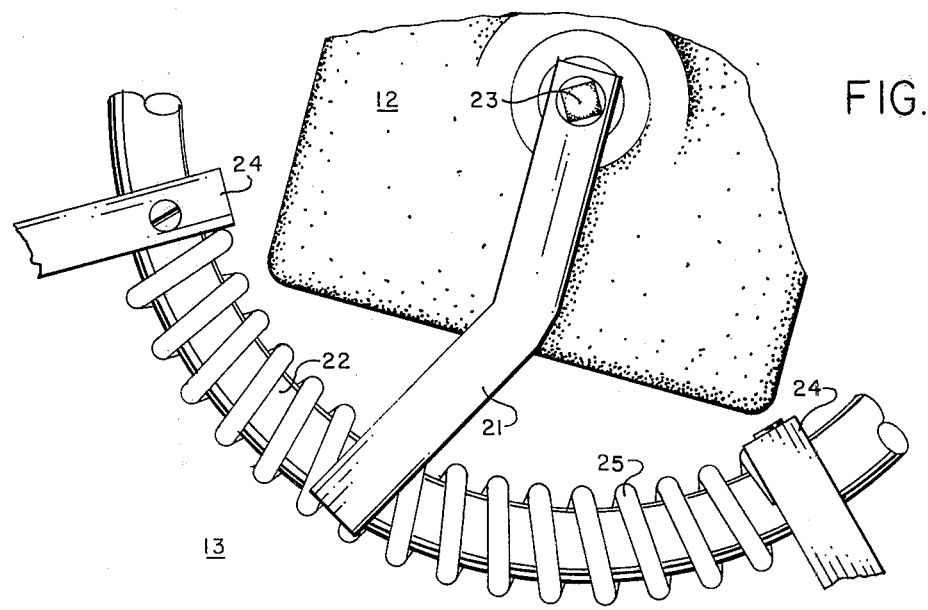
FIG. 3 is a fragmentary side-elevational view of the variable tension spring assembly of this invention.

The spring assembly 13 provides variable resistance to the steering assembly 12 simulating the variable resistance encountered by an actual steering assembly over its turning range. The spring assembly includes a spring arm 21, a spring 25 and a spring carrying rod 22. As is shown more clearly in the FIG. 3, the spring arm 21 is fastened at one of its terminal ends to the capston provided by the worm shaft 23 typically provided in the steering assembly 12. It may be seen that, as the worm gear shaft 23 is normally disposed transversely with respect to the main shaft 18, the arcuately shaped spring carrying rod 22 is normally mounted on the housing 15 with its geometrical center congruent with the center of the worm gear shaft 23. The spring carrying rod 22 is an arcuate shaft fastened at its terminal ends to the housing 15. The spring 25 is carried about the rod 22 and secured in a predetermined juxtaposition by stops 24 fastened at predetermined locations on the rod 22. The terminal end of the arm 21 opposite that connected to the worm gear shaft 23 is fastened approximately midway in the spring 25. It may be seen that it may be necessary to provide a bend, or dog leg, in the arm 21 to properly contact and follow the spring 25 mounted on the rod 22. It has been found to advantage to dress the rod 22 to provide substantially frictionless travel for the spring 25 over the rod 22.

In operation, the steering wheel 16 is addressed and manipulated by the student in the manner of actual steering wheels found in motor vehicles. As the worm gear shaft 23 rotates and thus actuates the arm 21 toward one of the extremes of the rod 22, the spring 25 is compressed to provide greater resistance or counterurging force to the arm 21, shaft 23 and assembly 12. The spring constant of the spring 25 may be chosen to best approximate the resistance characteristic found in an actual vehicle.

Having thus described in detail a preferred apparatus which embodies the concepts and principles of the invention and which accomplishes the various objects, purposes and aims thereof, it is to be appreciated and will be apparent to those skilled in the art that many physical changes could be made in the appartus without altering the inventive concepts and principles embodied therein. Hence, it is intended that the scope of the invention be limited only to the extent indicated in the appended claims.

We claim:

1. A driver training aid, comprising:
a base having an upstanding houseing;
a steering assembly comprising a worm gear shaft a steering wheel and a steering assembly having a sector shaft fastened to said steering wheel to provide substantially the same mechanical cooperation as is found in an actual steering wheel and steering gear, said steering assembly being mounted in said housing with the face of said steering wheel mounted at predetermined acute angle to the vertical; and
a variable resistance spring assembly comprising a spring arm fastened at one of its terminal ends to the worm gear shaft of said steering gear assembly, an arcuately shaped spring carring rod being substantially in a plane disposed perpendicularly to said worm gear shaft and fastened at its terminal ends to said housing with the geometrical center thereof being congruent with the center line of said worm gear shaft, and a spring being substantially coextensive with and being slidably carried on and having its ends secured to said spring carrying rod, the terminal end of said spring arm opposite the end connected to said worm gear shaft being fastened to the spring substantially midway of the length of said spring.

2. The apparatus of claim 1 wherein a pedestal is provided to support said housing, said pedestal being demountably secured to a table.

3. The apparatus of claim 1 wherein an electric turn signal handle assembly and a column-type gear shift handle are mounted on said sector shaft of said steering gear assembly, adjacent said steering wheel.

* * * * *